United States Patent

Maroshick

[15] 3,641,833

[45] Feb. 15, 1972

[54] MECHANICAL AMPLIFIER

[72] Inventor: Max Maroshick, Glen Mills, Pa.

[73] Assignee: The Boeing Company, Seattle, Wash.

[22] Filed: Sept. 30, 1969

[21] Appl. No.: 862,288

[52] U.S. Cl. ....................................74/479, 74/480, 244/83

[51] Int. Cl. ....................................G05g 11/00, B64c 13/28

[58] Field of Search ................74/479, 480, 483; 244/83, 84, 244/85

[56] References Cited

UNITED STATES PATENTS

| | | | |
|---|---|---|---|
| 2,452,599 | 11/1948 | Paulus | 74/480 |
| 2,503,498 | 4/1950 | Levy | 74/479 |
| 2,596,242 | 5/1952 | Hill | 244/85 |
| 2,597,361 | 5/1952 | Mott | 244/85 X |
| 2,940,332 | 6/1960 | Teague | 74/479 X |
| 3,286,958 | 11/1966 | Moran | 244/84 |
| 3,368,351 | 2/1968 | Wood | 244/84 |

FOREIGN PATENTS OR APPLICATIONS

| | | | |
|---|---|---|---|
| 130,213 | 7/1919 | Great Britain | 244/85 |

*Primary Examiner*—William F. O'Dea
*Assistant Examiner*—Thomas R. Hampshire
*Attorney*—Finnegan, Henderson & Farabow

[57] ABSTRACT

A mechanical amplifier is provided for use in a failure correction control system in which the amplifier receives two mechanical input signals during failure-free operation of the control system, and combines these signals to produce an output. The amplifier includes two mechanical channels which can comprise a series of pivotally connected links. Each channel includes an input element that receives a separate input signal and transmits this signal to an output member. Gain control means are connected to each channel to restore a full range of movement to the output member if one of the input signals is jammed. The gain control means increase the length of the output moment arm in the nonfailed channel. This increased moment arm increases the distance the nonfailed channel can move the output member and offsets the effect of the failed channel. The amplifier also includes disconnect failure accommodation means for maintaining a full range of output after a disconnect failure in the linkage supplying one input signal, or in one channel of the amplifier.

12 Claims, 10 Drawing Figures

INVENTOR
MAX MAROSHICK

Finnegan, Henderson & Farabow
ATTORNEYS

INVENTOR
MAX MAROSHICK

Finnegan, Henderson & Farabow
ATTORNEYS

INVENTOR
MAX MAROSHICK

Finnegan, Henderson & Farabow
ATTORNEYS

INVENTOR
MAX MAROSHICK

Finnegan, Henderson & Farabow

INVENTOR
MAX MAROSHICK

Finnegan, Henderson & Farabow
ATTORNEYS

INVENTOR
MAX MAROSHICK

Finnegan, Henderson & Farabow

INVENTOR
MAX MAROSHICK

Finnegan, Henderson & Farabow
ATTORNEYS

PATENTED FEB 15 1972

3,641,833

SHEET 08 OF 10

INVENTOR
MAX MAROSHICK

Finnegan, Henderson & Farabow
ATTORNEYS

INVENTOR
MAX MAROSHICK

Finnegan, Henderson & Farabow
ATTORNEYS

INVENTOR
MAX MAROSHICK

Finnegan, Henderson & Farabow
ATTORNEYS

MECHANICAL AMPLIFIER

FIELD OF THE INVENTION

This invention relates to a mechanical amplifier for use in a failure correction control system, and more particularly to an amplifier which receives two mechanical input signals during normal operation of the control system and either combines these input signals to produce an output signal, or operates as an amplification switching device to phase in or phase out transmission of one of the input signals.

BACKGROUND OF THE INVENTION

The ever increasing demands for reliability in controls for dirigible craft such as airplanes, helicopters, spacecraft, ships and the like, has led to a demand for redundant control systems, that is, control systems containing (a) two or more channels for transmission of a plurality of similar input signals, and (b) switching means for selectively transmitting an output signal that is proportional to one or more of the input signals.

While the amplifier of the present invention can be used in a number of mechanical control systems where redundancy is desired, it is particularly useful in control systems that incorporate two active similar independent input signals. Upon failure of one of the input signals, the other input signal remains available for continued control of the output system.

The new mechanical amplifier can, for instance, be incorporated in an aircraft control system in which a pilot's control stick activates two similar independent linkages which form the inputs to the amplifier. The output from the amplifier can comprise movement of a single output control linkage or selective movement of a pair of output linkages. In the former application, the invention assures a continuing output at full authority in the event either one of the input control linkages fails.

Two types of failure are possible in a mechanical linkage system for transmitting a mechanical input signal—disconnect failures and jam failures.

A typical disconnect failure occurs when one mechanical element in a linkage becomes operationally disengaged. The mechanical elements in the failed linkage are generally free to move and do not adversely retard the movement of elements of a mechanical amplifier device to which the linkage is attached. However, the disconnected linkage does not transmit an effective mechanical signal to the amplifier device.

A typical jam failure occurs when two adjacent parts of a mechanical linkage seize, thus locking the entire linkage in a certain position. A jam failure, besides terminating the transmission of an input signal, can have a further effect on the performance of the mechanical amplifier, since one input element of the amplifier may also be frozen or locked in position by the jam failure in the input linkage.

SUMMARY OF THE INVENTION

It is an object of this invention to provide a new and improved mechanical amplifier for use in a failure correction control system in which the amplifier receives and transmits two active and similar mechanical input signals during normal operation of the control system.

Another object of this invention is to provide an amplifier device for receiving and integrating two input signals, which upon the jam failure of one input signal possesses the capability of increasing the authority of the remaining active signal.

Still another object of this invention is to provide a mechanical amplifier device that will null out the effect of a failed input signal and increase the authority of the remaining working signal without requiring transient movement of the mechanical elements at the output of the amplifier.

A further object of this invention is to provide a reliable and rugged mechanical amplifier that can be used in a failure correction control system.

Additional objects and advantages of this invention will be set forth in the description which follows and in part will be obvious from the description or may be learned by the practice of the invention.

The invention comprises a mechanical amplifier for use in a failure correction control system in which the amplifier receives two mechanical input signals during normal operation of the control system. The amplifier includes a frame; a first channel for receiving one of the input signals and transmitting this signal to the output of the system; a second channel for receiving the other input signal and for transmitting this signal to the output of the system, and a gain control means for increasing the length of a moment arm in the still-active channel and thus increasing the range of travel of the terminal arm of the still-active channel, after a jam failure occurs in one channel.

Preferably, the first and second channels each include an input element which is responsive to one of the input signals, a plurality of pivotally connected links connected in series to the input element, and a terminal arm pivotally connected to the last link in the series.

In preferred embodiments, the gain control means is movably mounted on the frame and is connected to a link of each of the channels. Movement of the gain control means permits increasing a moment arm of the operative channel and decreasing to zero the effective moment arm of the inoperative channel.

Thus, the gain control means provides the capability of increasing the distance the operative channel moves the terminal arm of the still-active channel in relation to the distance the operative input signal moves the input element of the still-operative channel.

In a preferred form of the invention for use in a fully redundant control system which includes two final control elements, the first and second channels are connected to an output means that comprises separate output members.

In the below described preferred form of the invention for use in a control system which includes only one final control element, the first and second channels are connected to a single output member.

It is preferred that the amplifier include a disconnect failure accommodation means that permits moving the output means through its full range of travel after a disconnect failure occurs in one of the input signals to the amplifier or in the amplifier itself. In a preferred form of the invention for use in a control system containing a single final control element, the output member is mounted for translational movement relative to the frame, and the terminal arms of the first and second channels are pivotally mounted on the output member along a single axis. The disconnect failure accommodation means connect the terminal arms and the output member at a second point so that the terminal arms and the output member move translationally with respect to each other even after a disconnect failure occurs in one of the input signals.

It is to be understood that both the foregoing general description and the following detailed description are exemplary and explanatory but are not restrictive of the invention.

The accompanying drawings illustrate an example of a preferred embodiment of the invention and, together with the description, serve to explain the principles of the invention.

Figure 1:
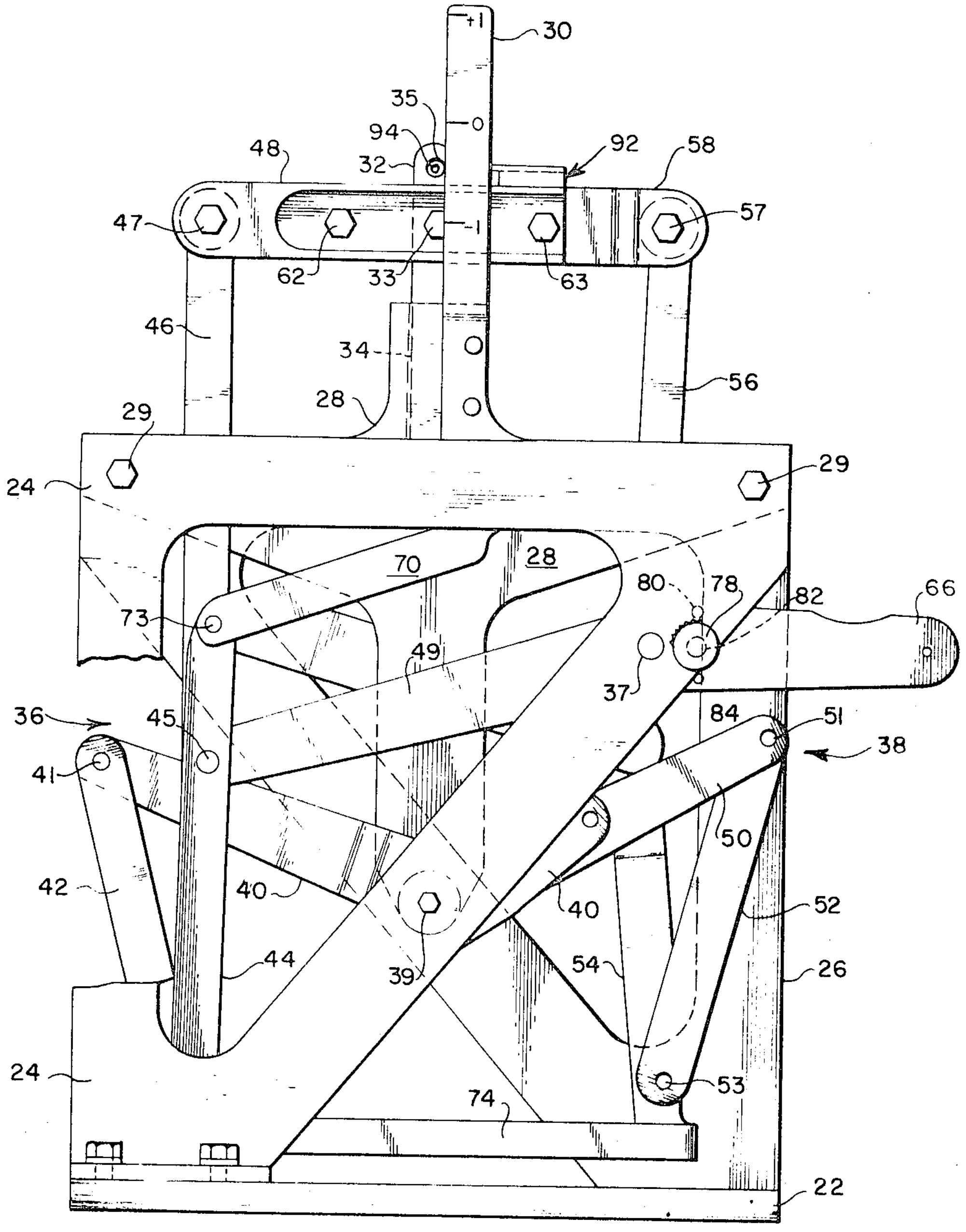
FIG. 1 is a front elevation of an amplifier constructed in accordance with the teachings of this invention with a portion of the frame broken away for clarity.
Figure 5:
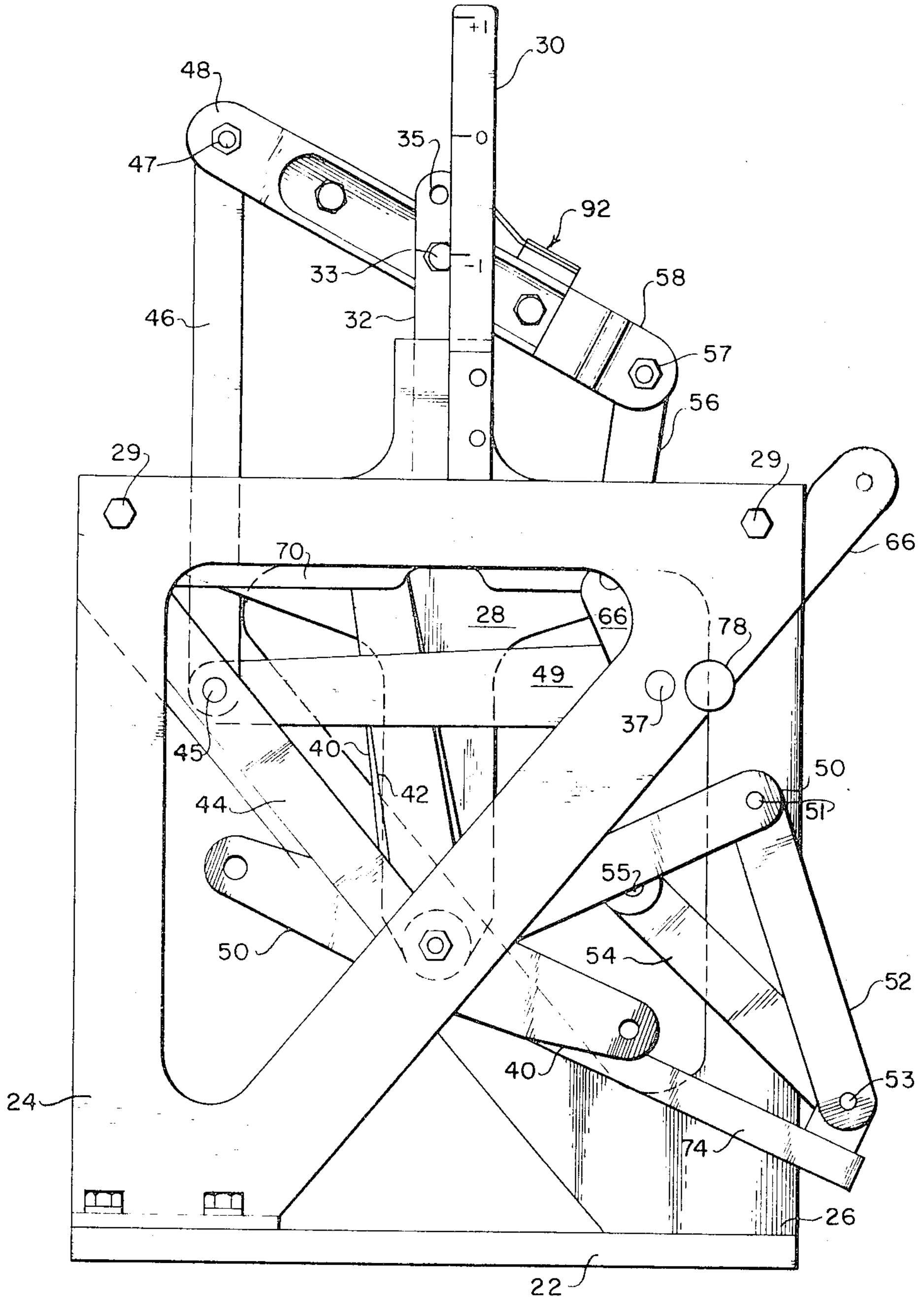
Figure 6:
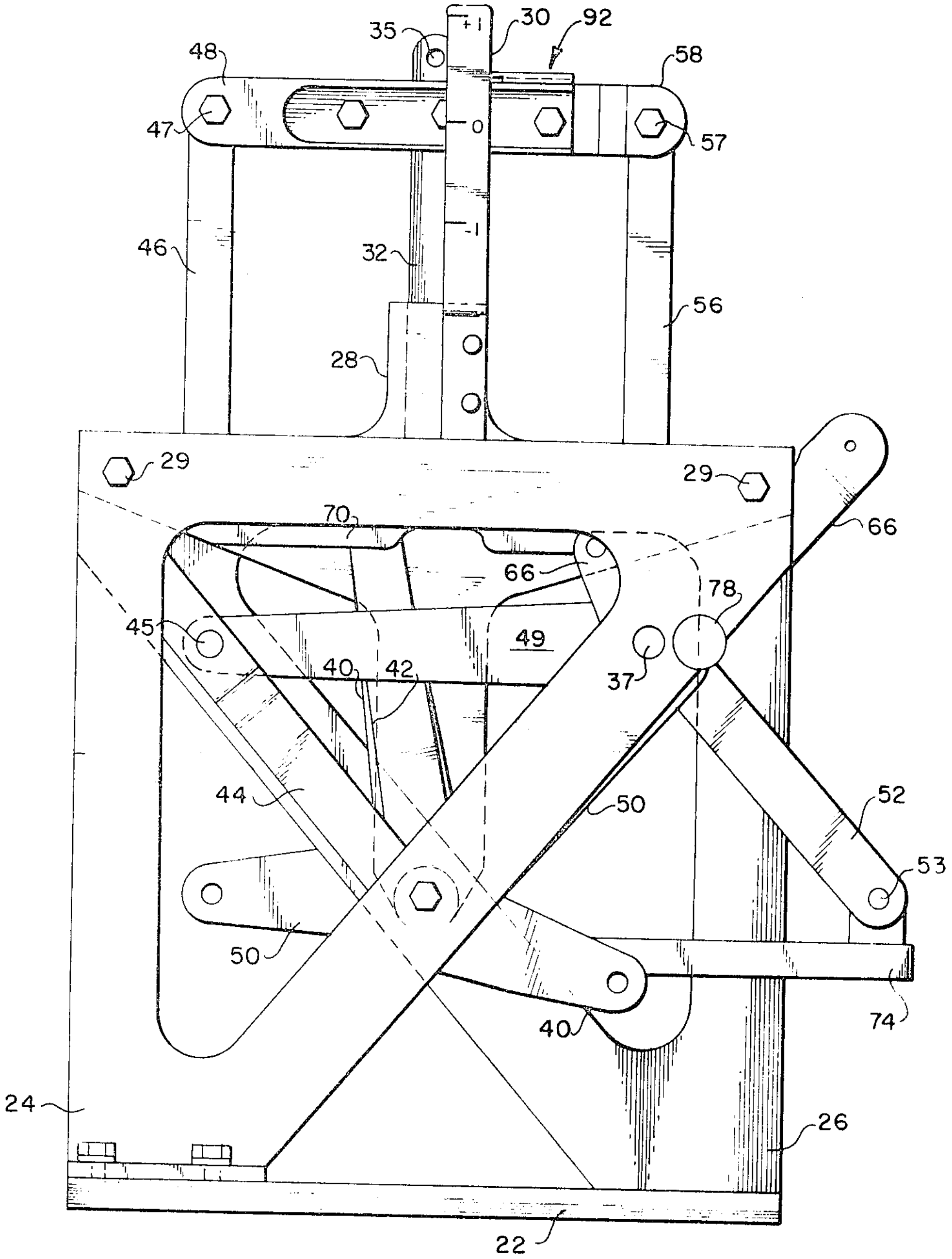
Figure 7:
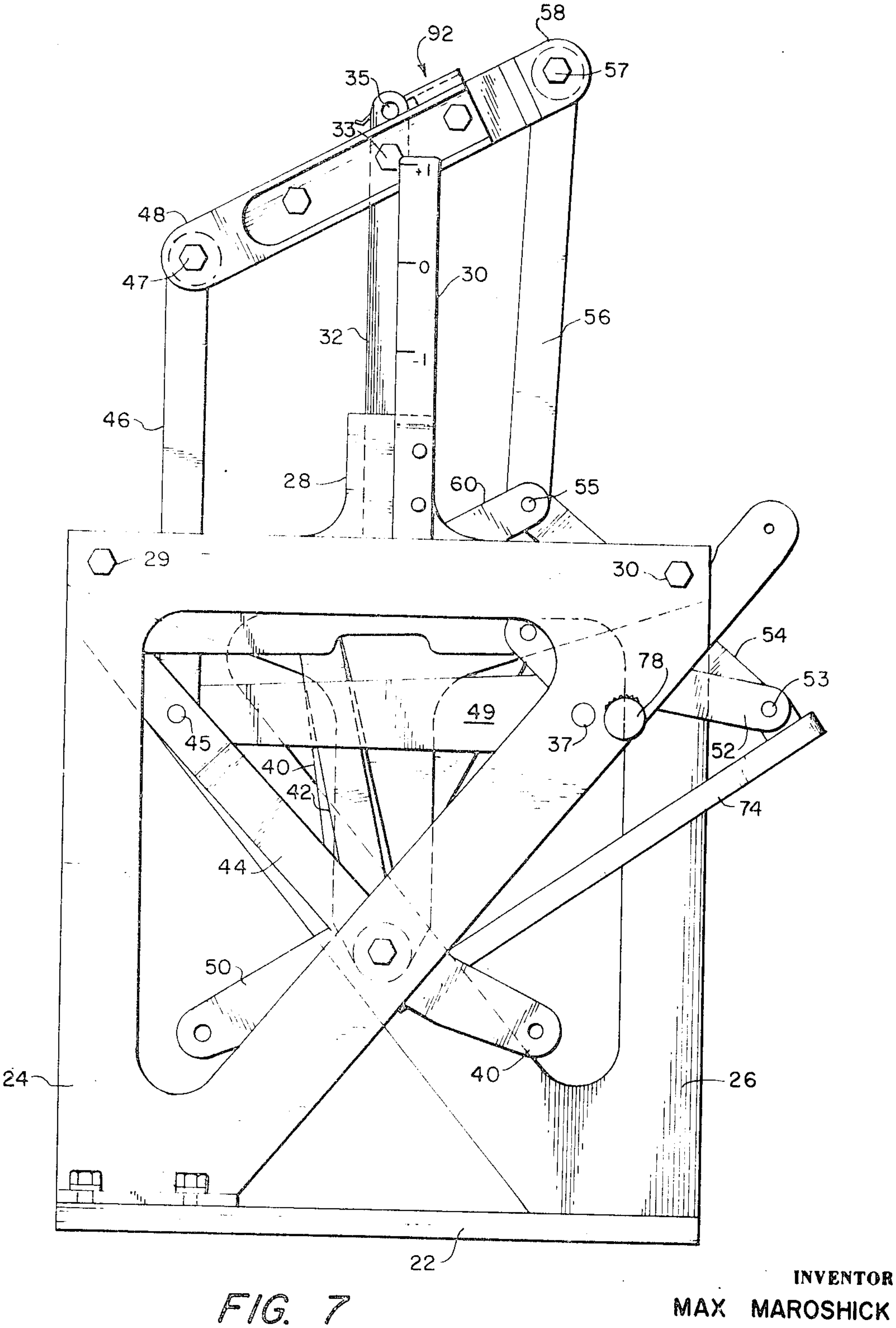
Figure 8:
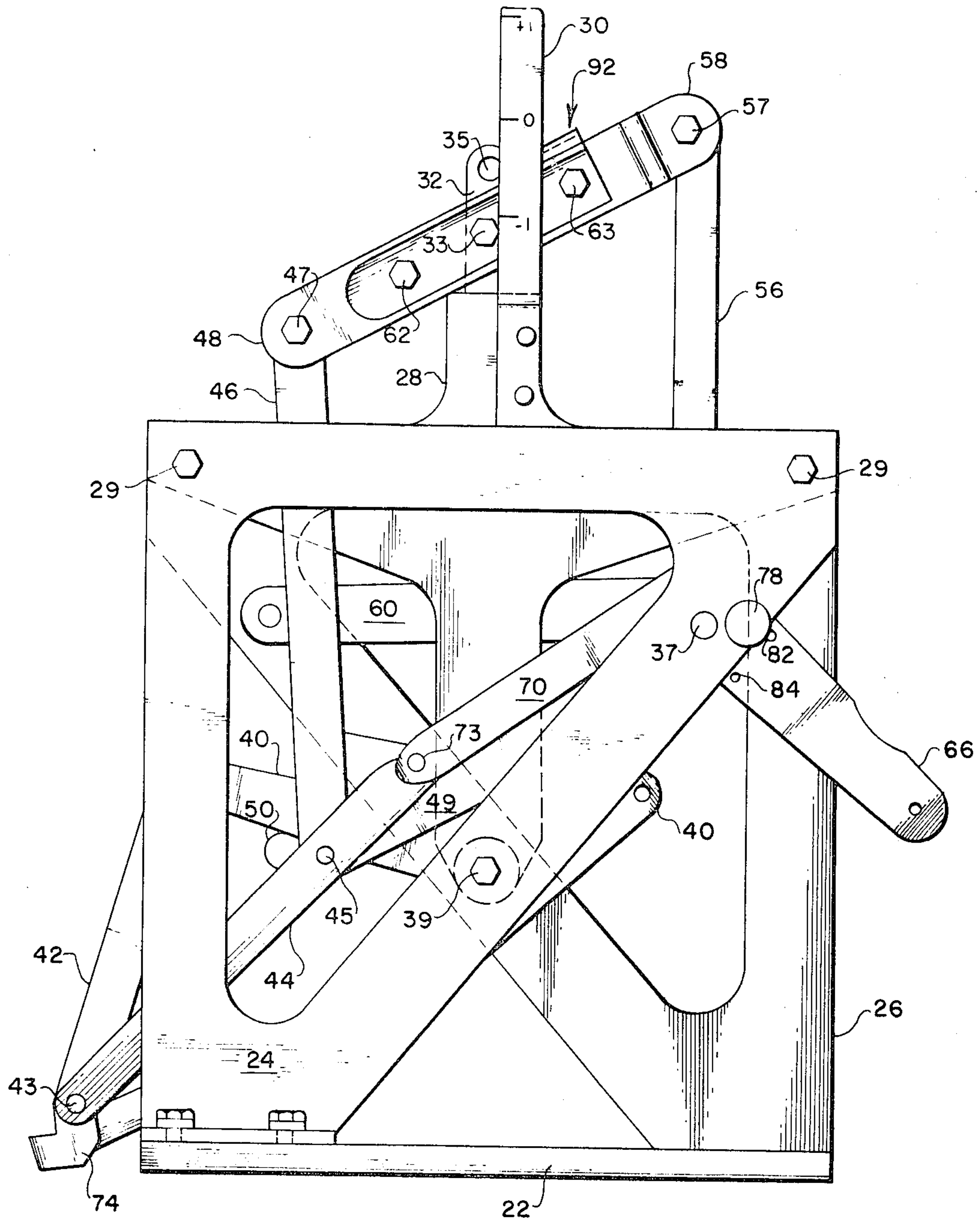
Figure 9:
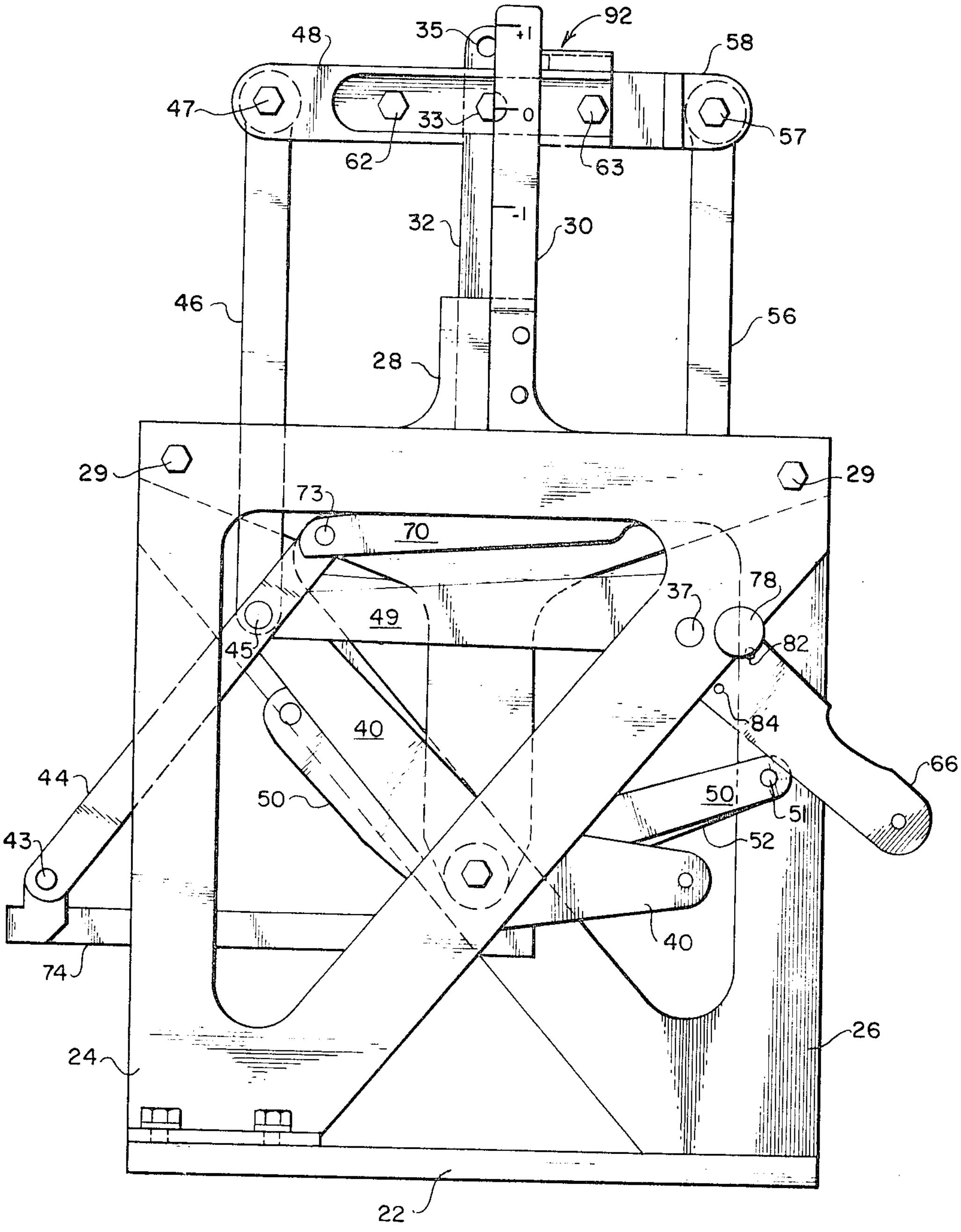
Figure 10:
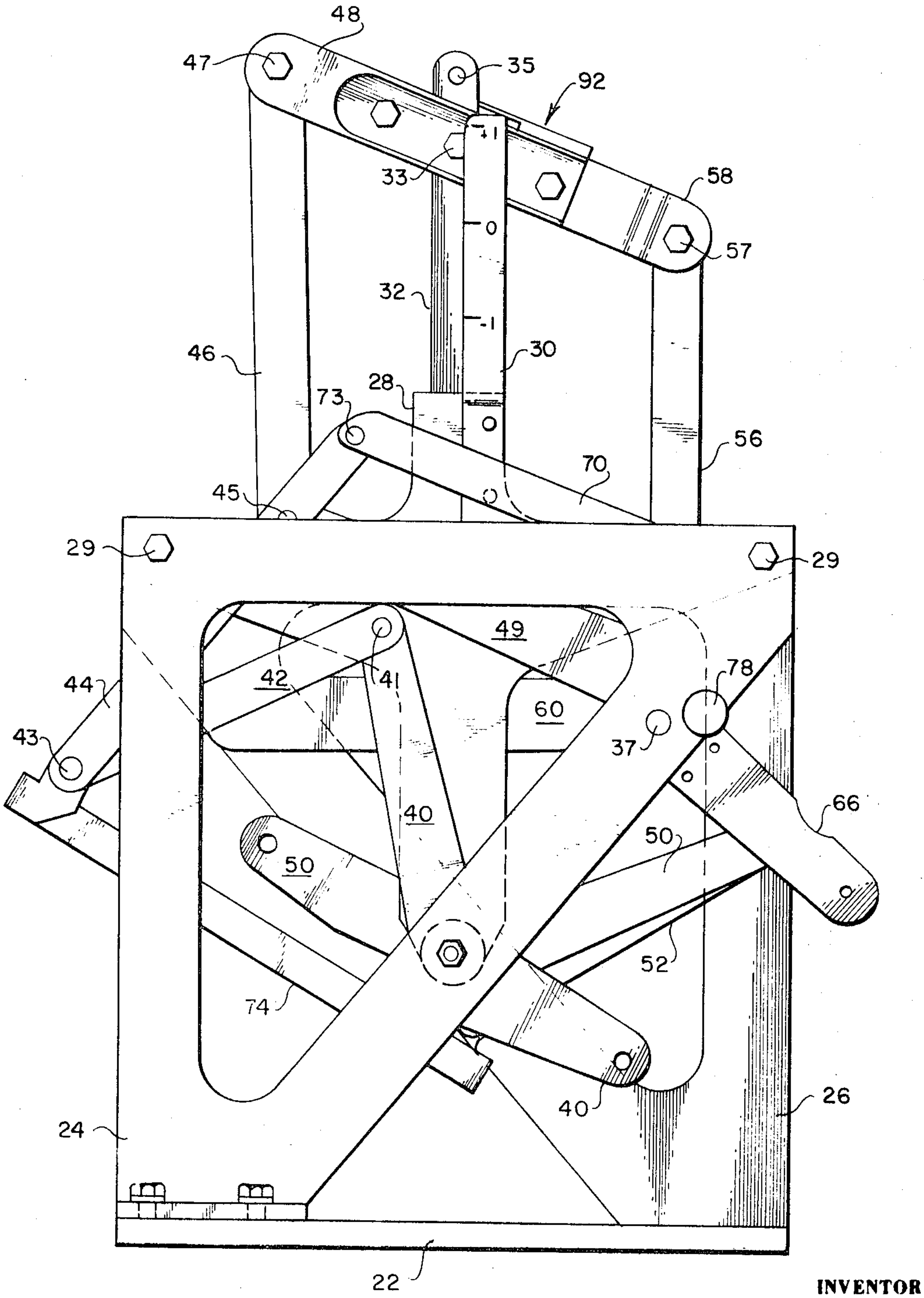

FIG. 5, 6, and 7 illustrate the position of the elements of the amplifier of FIG. 1 in response to various input signals to the back channel after a failure has occurred in the signal to the front channel, and the gain control means have nulled out the effect of the lost input signal; and FIGS. 8, 9, and 10 illustrate the position of the elements of the amplifier of FIG. 1 in response to various input signals to the front channel after a failure has occurred in the signal to the back channel, and the gain control means has nulled out the effect of the lost input signal.

DETAILED DESCRIPTION OF A PREFERRED EMBODIMENT

Figure 2:
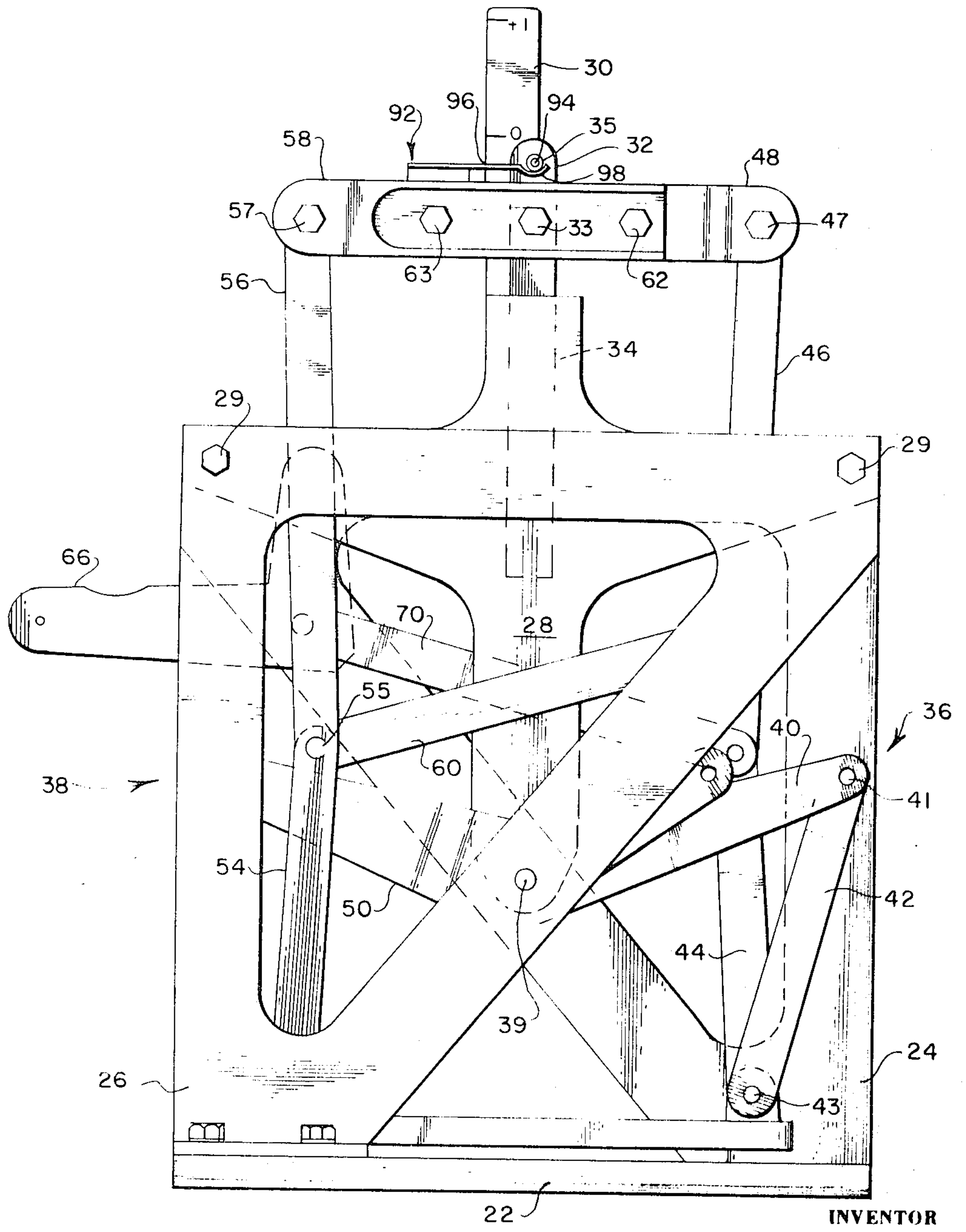
FIG. 2 is a back elevation of the amplifier of FIG. 1.

FIGS. 1 and 2, a mechanical amplifier of this invention is illustrated mounted on a frame that includes a base 22, a triangular front plate 24, a triangular backplate 26 and a suspended member 28 that is suspended between plates 24 and 26 by a pair of pins 29.

A scale element 30 is fixed to member 28 and has elevation markings inscribed thereon as shown in FIG. 1 for display purposes only. The elements of the frame are rigid and their positions are fixed in relation to each other.

An output means is mounted on the frame to permit a range of movement of the output means relative to the frame. The output means can comprise a single output member for use in a system containing only one final control element, or can comprise two output members for use in a fully redundant system including two final control elements.

As here embodied, and as illustrated in FIG. 1, an output member 32 is slidably mounted in a central slot 34 of suspended frame member 28 and can be moved up and down relative to the frame.

An indicator pin 33 is mounted on output member 32 and moves translationally with output member 32 and can be visually aligned with scale element 30 for display purposes. Pin 33 can move from the elevation mark "−1" on scale element 30, to the elevation mark "+1."

An opening 35 extends from the front to the rear of output member 32 and forms part of disconnect failure accommodation means described below.

In accordance with the invention, the amplifier includes a pair of channels which each receive one input signal and transmit this signal to the output of the amplifier. Each channel includes an input element that is mounted on the frame for movement relative to the frame, and a plurality of pivotally connected links connected in series to the input element. The channels cooperate to provide a desired range of movement for the output means.

Figure 3:
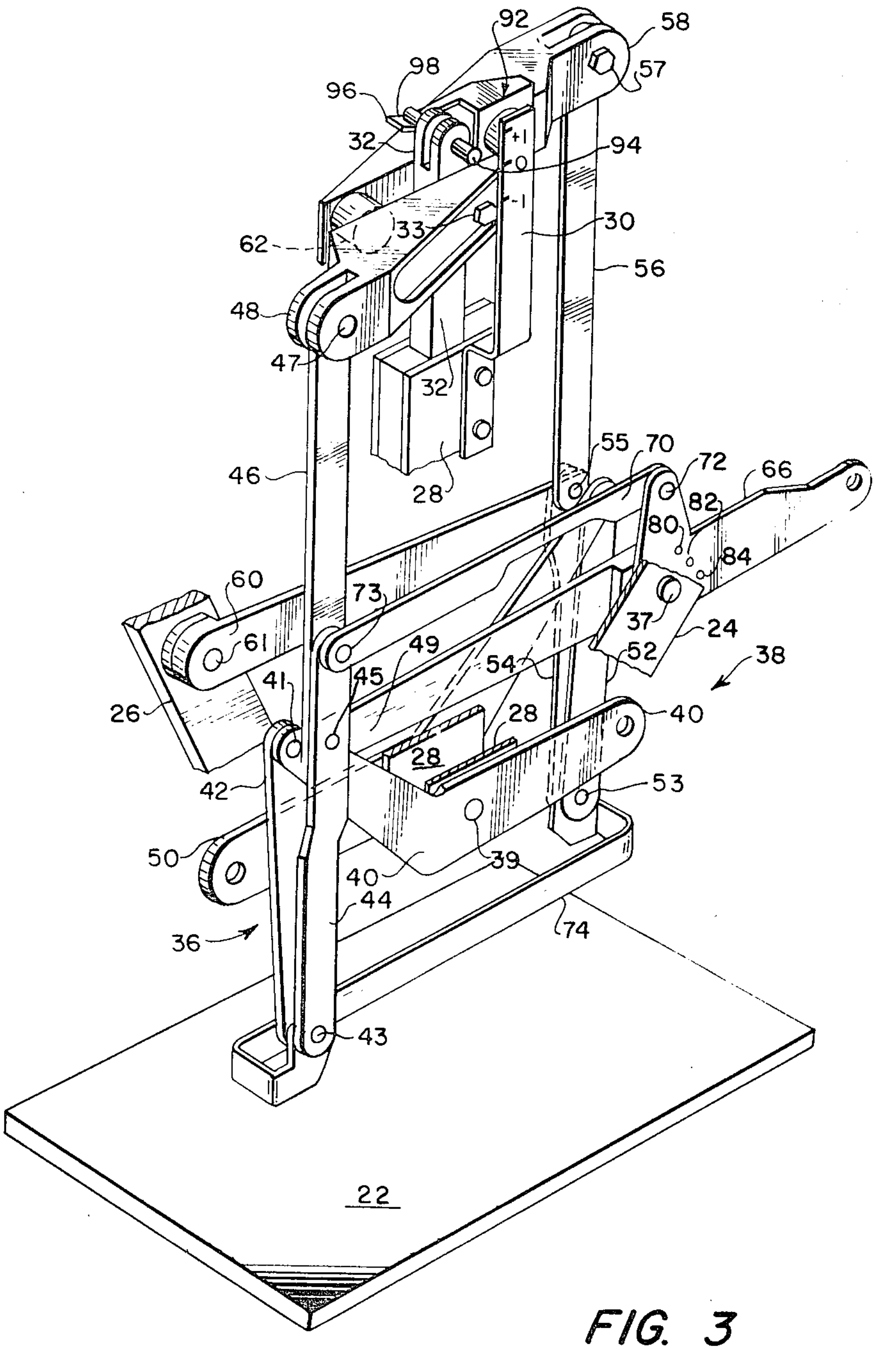
FIG. 3 is a perspective view of the amplifier of FIG. 1 with portions of the frame and output member broken away.
Figure 4:
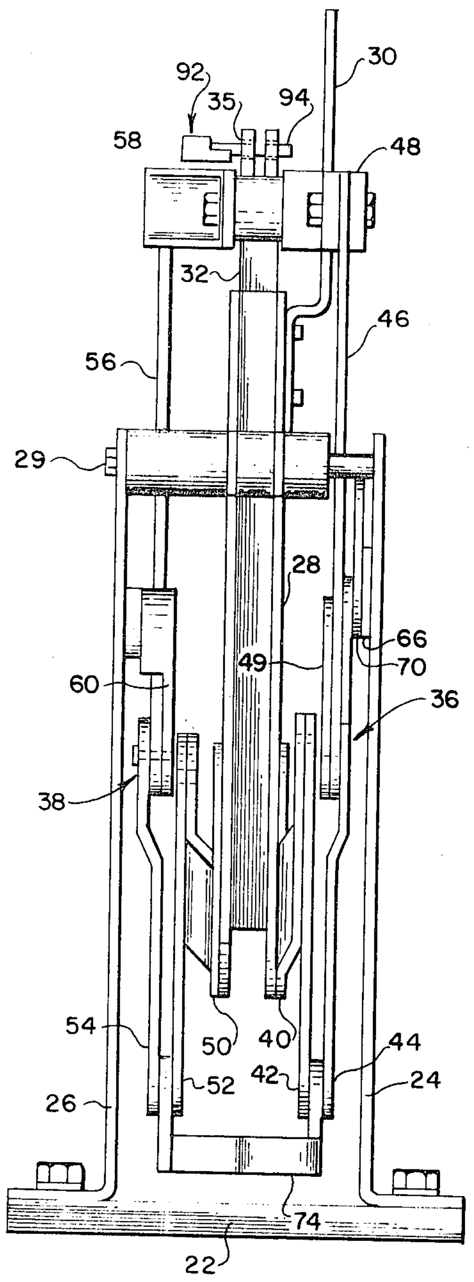
FIG. 4 is a side elevation view of the amplifier of FIG. 1.

As here embodied, and as illustrated in FIG. 4, the amplifier includes a front channel generally 36 and a back channel generally 38 which are located on opposite sides of frame member 28. As best seen in FIG. 3, front channel 36 comprises an input bell crank lever element 40 mounted on frame element 28 to pivot about stationary pin 39 and three pivotally connected links 42, 44, and 46 connected in series to input element 40, and a terminal lever arm 48 pivotally connected to the output member 32 by indicator pin 33. Input element 40 is connected to line 42 by a pivot pin 41, link 42 is connected to link 44 by a pivot pin 43, and link 44 is connected to link 46 by a pivot pin 45. Finally, link 46 is connected to terminal lever arm 48 by a pivot pin 47.

Pivot pins 39, 41, 43, and 45, and indicator pin 33 are all parallel and the input element, the links, and the terminal lever arm all move in parallel planes that are perpendicular to the axes of the pivot pins.

The above described pivot pins include a smooth-surfaced cylindrical shaft which permits a freely pivoting motion of the channel elements about the axis of the shaft. Small machine bolts which include a head at one end and a threaded portion at the other end of a cylindrical shaft in combination with a nut and a locknut can be used as a pivot pin.

An idler arm 49 is provided to limit the range of the positions the pivotally connected links 42, 44 and 46 can assume. Idler arm 49 is pivotally mounted on frame element 24 by a pivot pin 37 and is pivotally connected to links 44 and 46 by pivot pin 45.

Clockwise rotational movement of input element 40 about its axis of rotation 39, when transmitted through front channel 36 causes upward translational movement of output member 32 relative to the frame.

With reference to FIGS. 2 and 3, back channel 38 contains the same elements as front channel 36 in a generally mirror image relation to the front channel. Back channel 38 thus comprises an input bell crank lever element 50, pivotally connected to the frame by pin 39 three pivotally connected links 52, 54, and 56, with the link 52 pivotally connected to input element 50 by pivot pin 51 and the other links pivotally connected in series, with pivot pin 53 connecting links 52 and 54 and pivot pin 55 connecting links 54 and 56. Terminal lever arm 58 is pivotally connected to the output end of link 56 by pivot pin 57. Terminal arm 58 is in turn pivotally connected to output member 32 by indicator pin 33 which extends through terminal arm 48, output member 32, and terminal arm 58. Idler arm 60 pivots about pivot pin 61 attached to frame element 26, and pivot pin 55.

As illustrated in FIGS. 1 and 2, terminal arms 48 and 58 are connected together by a pair of pins 62 and 63 that keep the terminal arms aligned in a plane connecting pivot pins 47 and 57 so that the terminal arms in combination can be considered to be a whiffletree.

In accordance with the invention, a gain control means is connected to each of the channels of the amplifier and operates to move the location of at least one link of the nonfailed channel to a new location which increases the range of movement of the terminal arm of the nonfailed channel in relation to the distance the input signal moves the input element of the nonfailed channel. The gain control means thus increase the output of the nonfailed channel to compensate for the loss of output from the failed channel. Also, the gain control means null out the effect of the failed channel.

As here embodied, and as illustrated in FIG. 3, the gain control means includes a bellcrank switching arm 66 that is pivotally connected to frame element 24 by pivot pin 37 and is pivotally connected to a link 70 by a pivot pin 72. Link 70, in turn is pivotally connected to link 44 of front channel 36 by a pin 73.

The gain control means also includes a connecting link 74 that connects the two channels and specifically connects pivot pin 43 of channel 36 to pivot pin 53 of channel 38.

The gain control means further includes a mechanism for fixing the position of switching arm 66 in any of at least three positions relative to the frame. These positions include: front channel active at full gain; both channels active at one-half gain; and back channel active at full gain.

The mechanism illustrated in FIG. 1 includes a thumbscrew 78 which projects through a threaded hole in front frame plate 24 and three holes 80, 82, and 84 in switching arm 66 that lie along an arc on the switching arm. Thumbscrew 78 is inserted into one of the holes 80, 82, or 84, when the appropriate hole is aligned with the threaded opening in front frame plate 24, to lock the switching arm 66 in one of the three positions. A three-position actuator forms a suitable means for changing and fixing the position of the switching arm 66.

During normal operation, when both input signals are being supplied to the amplifier, switching arm 66 is positioned with the central hole 82 aligned with the axis of thumbscrew 78, to permit the end of the screw to project through hole 82 to fix the position of switching arm 66 relative to the frame as illustrated in FIG. 1.

For ease of understanding, the operation of the gain control means will be described after the description of the disconnect failure accommodation means.

In accordance with preferred embodiments of the invention, a disconnect failure accommodation means is provided for moving the output member through its full range of travel even after a disconnect failure occurs in the signal to one channel. It should be noted, however, that the above-described gain control means can be used to restore a full range of movement to an output member after either a jam failure or a disconnect failure in an input signal of the elements of the channel, which is no longer receiving a signal, are moved to the lower one-half of their range of travel. However, the inclusion of a disconnect failure accommodation means is desirable since it comes into operation instantaneously upon a disconnect failure, and because it can counteract a disconnect failure in one of the amplifier channels.

As here embodied and as illustrated in FIGS. 1–4, the disconnect failure accommodation means comprises an opening 35, best seen in FIG. 4, extending across output member 32; a detent member, generally 92, fixed to the terminal arm of one of the channels and a releasable pin 94. Detent member 82, as illustrated in FIG. 2, is constructed of a resilient metal and includes a centilevered arm 96 which will deform when stressed, Alternatively, the detent member could be rigid and pin 94 could be a shear pin that shears after a jam failure has occurred.

As seen in FIG. 1, in the present embodiment, detent member 92 is mounted on terminal arm 58 of back channel 38, by pins 62 and 63 which extend through the detent member and through terminal arms 48 and 58.

Centilevered arm 96 includes a seating slot 98 or detent, best illustrated in FIG. 2, that projects inwardly from arm 96 towards output member 32 and is aligned with opening 35 of the output member 32 when both channels are operating.

A releasable pin 94 rests in slot 98 and extends from slot 98 through openings 35 in output member 32 to releasably fix the relative positions of output member 32 and terminal arms 58 and 48. Arm 48 is included in the connection since terminal arms 48 and 58 are connected by pins 33, 62 and 63.

During normal operation when the amplifier is receiving two equal active input signals each of the channels 36 and 38 transmits one half of the force necessary to move the output member through its full range of travel.

Channel 36 can move pivot pin 47 between elevations "−1" and "+1" and channel 38 can move pivot pin 57 between the same elevations. During this normal operation, equal input signals acting through the respective lever arms of each channel keep terminal arms 48 and 58 aligned in a generally horizontal plane.

If a disconnect failure occurs in the linkage supplying a signal to front channel 36, or in channel 36 itself, only input member 50 continues to receive an active signal. Input element 40 can still be pivoted about the frame and the links of the front channel are free to pivot, but no output is received at terminal arm 48.

Referring to FIG. 3, the active signal to input member 50 is transmitted through back channel 38 and can translationally move pivot pin 57 connecting terminal arm 58 and link 56 between elevations corresponding generally to the mark "−1" and the mark "+1" on indicator element 30. With reference to FIGS. 1 and 3, an input signal to back channel 38 in the absence of a corresponding input signal to the front channel exerts a turning force that would tend to cause terminal arms 48 and 58 to pivot in a counter clockwise direction about the axis of pin 33. Pivot pin 57 of channel 38 moves between the full range of "1" to "+1" on the indicator element 30 and indicator pin 33 which is connected to output member 52 only moves between the "−1 and "0" marks on indicator element 30. Thus, in the absence of the disconnect failure accommodation means, the input signal to back channel 38 would only move the output member through half of its full desired range of travel.

However, after a disconnect failure, removable pin 94 and detent member 92 resist the torque applied by link 56 to terminal arm 58 and prevent pivotal movement of terminal arms 48 and 58 about pin 33 and keep both terminal arms 48 and 58 in a generally horizontal position. Thus, when pivot pin 57 moves through its full range of travel, output member 32 and indicator pin 33 will move through their full range of travel and hence an input signal to only back channel 38 will move the output member through its full range of travel.

In a similar fashion, the disconnect failure accommodation means permit an input signal to front channel 36 to move output member 32 through its full range of travel, when there is a disconnect failure in the linkage providing a signal to the back channel or even a disconnect failure in the linkage of the back channel itself.

The operation of both of both the disconnect failure accommodation means and the operation of the gain control means when a jam failure occurs will now be described for the situation where a jam failure occurs in the linkage supplying a signal to back channel 38.

The input element 50 of back channel 38 is frozen in position by the jam failure while the elements of front channel 36 are able to freely move in response to the input signal received by input element 40.

One effect of a jam failure on back channel 38 is deformation of the resilient centilevered arm 96 of detent member 92, since the position of pin 57 becomes fixed. Vertical motion of link 46 in response to variations in the input signal to the front channel will pivot terminal arms 46 and 56 about pin 57 and thus will tend to misalign holes 35 in output member 32 and seating slot 98 and cause releasable pin 94 to be disengaged from the seating slot.

Since terminal arms 48 and 58 now pivot about pin 57 and output member 32 is connected at the midpoint of arms 48 and 58, output member 32 is only carried through half of its normal range of movement by the normal movement of pin 47.

The output from the amplifier is now reduced to one half normal gain by the jam failure and the subsequent disengagement of the disconnect failure control means. The gain control means described above is used to restore full gain to output member 32.

First the locking mechanism that fixes the position of switching arm 66 in relation to the frame is disengaged. In the illustrated embodiment this disengagement is accomplished by rotating thumbscrew 78 to disengage it from hole 82 in switching arm 66. An external force is then applied to switching arm 66 to pivot it in a clockwise direction, with reference to FIG. 3 about pivot axis 51 to the position illustrated in FIGS. 8–10. When arm 66 is in this position, hole 80 is aligned with screw 78 and the switching arm 66 is fixed in position with relation to the frame by turning thumbscrews 78 into hole 80.

Movement of switching arm 66 clockwise to its new position moves pin 57 to an elevation corresponding to "0" on indicator element 30, and fixing switching arm 66 in its new position fixes the position of pin 57 at this elevation. However, it should be noted that since terminal arms 48 and 58 can pivot about pin 33, movement of switching arm 66 does not require transient movement of output member 32.

Movement of switching arm 66 clockwise about pin 51 moves pin 43 and the lower portions of lever arms 42 and 44 to the left as seen in FIG. 8, a distance sufficient to double the length of the effective moment arm about pin 39 in the front channel. Also, pin 53 is coaxially aligned with pin 39 to null out the effective moment arm of the back channel.

In this new position of switching arm 66 the same amount of movement of input member 40 will result in twice the amount of movement of pin 47, and pin 47 will move through a range of travel twice the length of the "−1" to "+1" distance on scale element 30. Thus even though terminal arms 48 and 58 pivot about pin 57, output member 32 will move through its full range of travel since pin 47 now moves twice the normal distance and pivots terminal arms 48 and 58 through an arc which results in normal movement of output member 32.

In a similar fashion, if a jam failure occurs in front channel 36, releasable pin 94 becomes disengaged from seating slot 98 and output member 32 can be moved through only one half of its normal desired range. To restore the full range of movement to output member 32, switching arm 66 is rotated counterclockwise to a position in which hole 84 is aligned with thumbscrew 78, and the thumbscrew is inserted through hole 84 to fix the position of switch arm 66 with respect to the frame. The counterclockwise movement of switch arm 66 requires pin 53 and links 52 and 54 to move to the right from the position illustrated in FIG. 3 to the position shown in FIG. 5.

When the switch arm is fixed in the position shown in FIG. 5, movement of input member 50 through its normal range of movement will move output member 32 through its full range of movement as seen in FIGS. 5–7.

It can readily be seen that if output member 32 is omitted, the amplifier can be used in a system containing two normally active input signals and redundant final control elements. In such a system, upon a jam failure of the linkage supplying one input signal, the amplifier nulls out the effect of one final control element and doubles the output of the other control element.

While this invention has been described in simplified terms for ease in understanding, it will be apparent to those skilled in the art that in most practical applications of the amplifier in failure correction control systems, it will be desirable to incorporate into the system an automatic device for sensing a jam failure, and an automatic device, such as a hydraulic or electrical three-position actuator for actuating the gain control mechanism when a failure is sensed.

In summary, the invention provides a mechanical amplifier for use in a failure correction control system in which the amplifier receives two mechanical input signals during normal operation of the control system and adds these signals to form an output signal. The amplifier includes two mechanical channels, each normally operating at half its potential gain or output. Each channel receives a separate input signal and transmits this signal to an output means. Gain control means are connected to each channel to increase the output of the channel to full gain.

In the illustrated embodiment, the gain control means restores a full range of movement to a single output member if one of the input signals is jammed, by increasing the length of the effective moment arm in the nonjammed channel and nulling out the inoperative channel. The amplifier also preferably includes disconnect failure accommodation means for maintaining a full range of movement of the output means after a disconnect failure in the mechanical linkage supplying one input signal.

The mechanical amplifier can be constructed to be rugged and reliable, for use in control systems where maximum reliability is required. Further, the amplifier can be fully automated so that it senses the failure of an input signal in either channel and automatically compensates for this failure. The unique construction of the amplifier permits the amplifier to null out the effect of a failure in the input channel at any position of travel of the output member without requiring transient movement of the output member before initiation of the corrective action.

The invention in its broader aspects is not limited to the specific details shown and described, but departures may be made from such details without sacrificing its chief advantages.

What is claimed is:

1. A mechanical amplifier for use in a failure correction control system in which the amplifier receives two similar mechanical input signals during normal operation of the control system, the amplifier comprising:

a. a frame;

b. a first channel for receiving one of the input signals and transmitting the signal to the output of the system, said first channel including an input element mounted on said frame for rotational movement about a first axis relative to said frame in response to one of the input signals, a plurality of pivotally connected links connected in series to said input element; and a terminal arm pivotally connected to the last link in the series.

c. a second channel for receiving the other input signal and for transmitting this signal to the output of the system, said second channel including an input element mounted on said frame for rotational movement about a second axis relative to said frame in response to the other signal, a plurality of pivotally connected links connected in series to said input element, and a terminal arm pivotally connected to the last link in the series;

d. the links of said first channel and the links of said second channel each being connected by a pivot pin to an adjacent link for pivotal movement, each of said links of said first channel and said second channel pivoting about parallel axes; and e. a gain control means including a switching arm pivotally mounted on said frame and pivotally connected to a link of each of said first and second channels, and means for fixing said switching arm in various rotational positions relative to said frame, including a position in which i. said switching arm fixes one of said pivot pins connected to a link in said first channel in coaxial alignment with said first axis to null out the effect of a jam failure in said first channel, and ii. said switching arm increases the radial distance between one of said pivot pins connected to a link in said second channel and said second axis to increase the range of travel of said terminal arm of said second channel in response to the input signal to the second channel upon a jam failure in said first channel.

2. The invention of claim 1 including an output member mounted for translational movement relative to said frame, and wherein said terminal arms of said first and second channels are structurally connected and aligned in a plane, said terminal arms being pivotally mounted on said output member at a given axis, and including disconnect failure accommodation means for moving said output member through its full range of travel even after a disconnect failure occurs in one of the input signals or one of said channels, said disconnect failure accommodation means connecting said terminal arms and said output member at a point spaced from said given axis so that said terminal arms and said output member move translationally with respect to each other even after a disconnect failure occurs in one of said channels, said disconnect failure accommodation means being releasable to permit said terminal arms to pivot about said axis of said output member if a jam failure occurs in either channel.

3. The invention of claim 2 in which said disconnect failure accommodation means includes an opening in said output member; a detent member mounted on said structurally connected terminal arms and having a seating slot that is aligned with said opening in said output member when the input signals are in phase, said detent member being mounted for movement with one of said terminal arms; and a releasable pin for insertion through said opening and said slot to structurally connect said output member and said terminal lever arm of said one channel.

4. The invention of claim 1 in which said first and second axes are coaxially aligned; and including a connecting arm that is pivotally connected to a link of said first channel and pivotally connected to a link of said second channel.

5. A mechanical amplifier for use in a failure correction control system in which the amplifier receives two active mechanical input signals that are combined in the amplifier to produce an output signal during normal failure-free operation of the control system, said amplifier comprising:

a. a frame;

b. an output member mounted on said frame for a range of translational movement relative to said frame;

c. a first channel for receiving one of the input signals and transmitting the signal to said output member, said first channel including an input element mounted on said frame for rotational movement about a first axis relative to said frame in response to the input signal; a plurality of links pivotally connected in series to said input element; and a terminal arm pivotally connected to the last link in the series, and pivotally connected to said output member;

d. a second channel for receiving the other input signal and for transmitting this signal to said output member, said second channel including an input element mounted on said frame for rotational movement about a second axis in response to the other input signal, a plurality of links pivotally connected in series to said input element and a terminal arm pivotally connected to the last link in the series and pivotally connected to said output member; said terminal arms of said first and second channels being aligned in a common plane and fixedly connected so that said arms are capable of pivoting together about a single axis of said output member; and e. gain control means for restoring the full range of movement to said output member if one of the mechanical input signals fails, said gain control means mounted on said frame and connected to a link of each of said first and second channels for fixing the position of a pivot pin connecting the terminal arm and the last link of the inactive channel, and for increasing the travel of a pivot pin connecting the terminal arm and the last lever arm of the remaining active channel.

6. The invention of claim 5 in which the links of said first channel and the links of said second channel all pivot about parallel axes, and including a connecting arm that is pivotally connected by a pivot pin to a link of said first channel and pivotally connected to a link of said second channel; and said gain control means includes a switching arm pivotally mounted on said frame and pivotally connected to a link of each of said first and second channels, and means for fixing said switching arm in various rotational positions relative to said frame, including a position in which i. said switching arm fixes one of said pivot pins connected to a link in said first channel in coaxial alignment with said first axis to null out the effect of a jam failure in said first channel, and ii. said switch arm increases the radial distance between one of said pivot pins connected to a link in said second channel and said second axis to increase the range of travel of said terminal arm of said second channel upon a jam failure in said first channel.

7. The invention of claim 6 in which said first and second axis are coaxially aligned and the input elements of said first and second channels are pivotable in spaced planes about a common axis; and each channel includes a first, second, and third link, and also includes an idler arm that is pivotally mounted on said frame and pivotally mounted on a pin that pivotally connects said second and third links; and said gain control means comprises switching arm pivotally mounted on said frame, structural means pivotally connecting said switching arm and said second link of said first channel, and means to fix the position of said switching arm relative to said frame, said gain control means being capable of moving a pin connecting said first and second link of either channel away from said common axis when a failure occurs in the other channel.

8. The invention of claim 5 including disconnect failure accommodation means for moving the output member through its full range of travel even after a disconnect failure occurs in one of said channels, said disconnect failure accommodation means connecting said output member and said terminal arms so that said output member moves translationally with said terminal arms, said disconnect failure accommodation means being releasable to permit said terminal arms to pivot with respect to said output member if a jam failure occurs in either input signal.

9. The invention of claim 5 in which said disconnect failure control means includes an opening in said output member; a detent member having a slot that is aligned with the opening in said output member when the input signals are in phase, said detent member mounted for movement with said terminal arms, and a releasable pin for insertion through said opening and said slot to structurally connect said output member and said terminal arms.

10. The invention of claim 5 in which the terminal arm of said first channel and the terminal arm of said second channel are aligned in a plane and fixedly connected to each other, and said terminal arms are each pivotally connected to said output member for rotation about a single axis; and including a disconnect failure accommodation means for moving the output member through its full range of travel even after a disconnect failure occurs in either channel, said disconnect failure control means including structural means connecting said terminal arms with a point on said output member spaced from said single axis, and including a releasable pin to permit said terminal arms to pivot about said single axis if a jam failure occurs in the control system.

11. The invention of claim 6 in which the terminal arm of said first channel and the terminal arm of said second channel are aligned in a plane and fixedly connected to each other, and said terminal arms are each pivotally connected to said output member for rotation about a single axis; and including a disconnect failure accommodation means for moving the output member through its full range of travel even after a disconnect failure occurs in either channel, said disconnect failure control means including structural means connecting said terminal arms with a point on said output member spaced from said single axis, and including a releasable pin to permit said terminal arms to pivot about said single axis if a jam failure occurs in the control system.

12. The invention of claim 7 in which the terminal arm of said first channel and the terminal arm of said second channel are aligned in a plane and fixedly connected to each other, and said terminal arms are each pivotally connected to said output member for rotation about a single axis; and including a disconnect failure accommodation means for moving the output member through its full range of travel even after a disconnect failure occurs in either channel, said disconnect failure control means including structural means connecting said terminal arms with a point on said output member spaced from said single axis, and including a releasable pin to permit said terminal arms to pivot about said single axis if a jam failure occurs in the control system.

* * * * *

UNITED STATES PATENT OFFICE
CERTIFICATE OF CORRECTION

Patent No. 3,641,833 Dated February 15, 1972

Inventor(s) MAX MAROSHICK

It is certified that error appears in the above-identified patent and that said Letters Patent are hereby corrected as shown below:

Claim 6, column 9, line 24, change "switch" to --switching--.

Signed and sealed this 11th day of July 1972.

(SEAL)
Attest:

EDWARD M.FLETCHER, JR.
Attesting Officer

ROBERT GOTTSCHALK
Commissioner of Patents